Sept. 15, 1970      B. D. MANROSS      3,528,188
FISHING FLOAT
Filed June 13, 1968
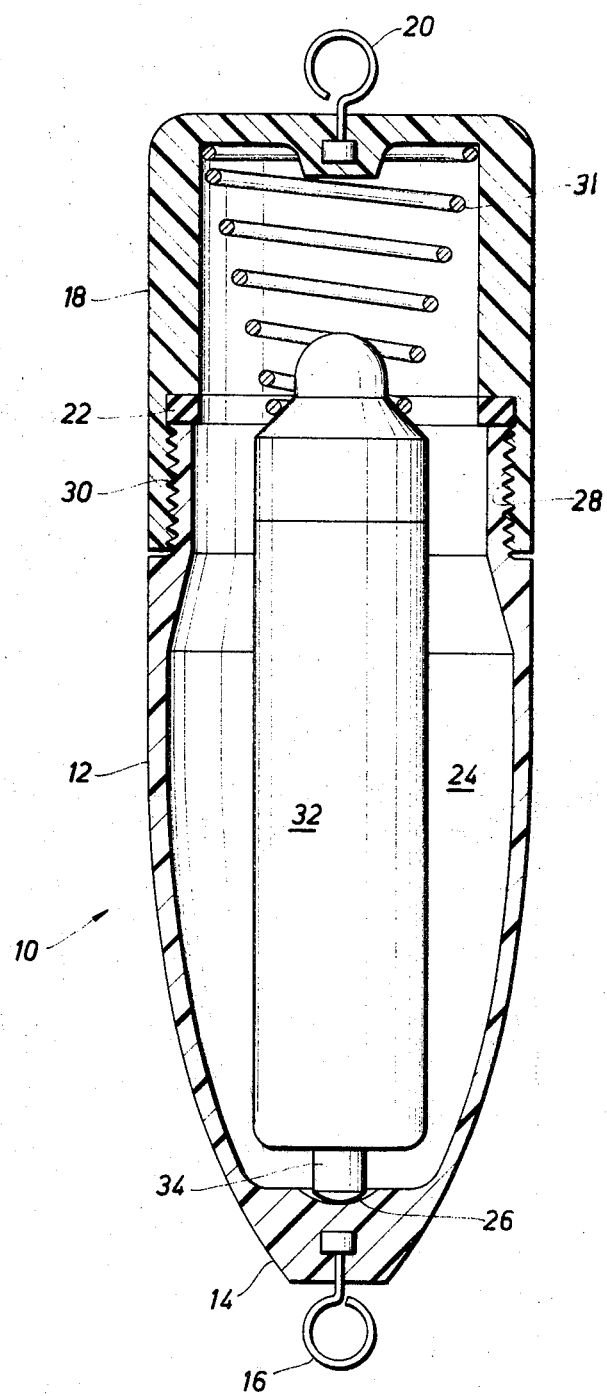
Bobby D. Manross
INVENTOR.
BY *Donald Gunn*
ATTORNEY

United States Patent Office 3,528,188
Patented Sept. 15, 1970

3,528,188
FISHING FLOAT
Bobby D. Manross, P.O. Box 14380,
Houston, Tex. 77021
Filed June 13, 1968, Ser. No. 736,774
Int. Cl. A01k 75/02
U.S. Cl. 43—17.5                                     2 Claims

ABSTRACT OF THE DISCLOSURE

A fishing float comprising a hollow body formed from at least two separable portions with one portion having a transparent or translucent end. A pen-light assembly is disposed in the hollow body in a manner for light therefrom to be transmitted through the transparent or translucent end to the fisherman.

SUMMARY OF PROBLEM AND INVENTION

Night fishing is rather popular for many people. It is quite difficult to perceive whether or not a fish is "nibbling" at the bait typically when the cork or float is just a few feet from the fisherman and beyond the illumination of any lanterns or lights operated for his convenience. When the cork or float is dimly illuminated at a distance, movements caused by the fish are easily confused with movements caused by the water. As a consequence, the fisherman becomes either hedgy, mistaking wave movements of the float for the bite of a fish, or is completely oblivious to "nibbles" which occur and consequently waits too long to begin retrieving the fish. Therefore, night fishing is considered difficult and is handicapped in this regard.

It is with the foregoing in view, and in further view of the fact that lights in the water generally tend to congregate fish nearby that the present invention is described as a night-fishing accessory serving as a cork or float, and which includes a closed chamber having a translucent upper portion through which a light is viewed by the fisherman. Said apparatus further has sufficient light-transmitting characteristics tending to congregate fish in the near vicinity.

Other objects and advantages of the present invention will become more readily apparent from a consideration of the included specification and drawings, wherein the single figure is a sectional view taken along the major axis of the present invention for illustrating suitably the internal details of construction.

In the single drawing, the numeral 10 indicates the improved fishing apparatus of the present invention. The apparatus 10 incorporates a main body portion 12 having a streamlined central portion faired to a lower end 14 at which a connective eyelet 16 is located for passage of a fishing line therethrough. A removable portion 18 is adapted to be threadedly engaged, as will be described, with the main portion 12, and carries a suitably positioned eyelet 20 adapted for passage of the fishing line therethrough or to be connected to the fishing line in a well-known manner. The two portions are joined together at a sealing gasket 22 such that water-tight integrity of an internal chamber 24 is protected. The chamber 24 is adapted to receive a light to be viewed through the upper portion 18, the upper portion 18 being formed of a suitably clear plastic selected from the many varieties of plastic now available.

The improved apparatus 10 is preferably in the range of about three to six inches in length, and is about one inch in diameter. The dimensions are not critical, and are varied over any range depending on the size of fishing tackle to be used with the present apparatus. The apparatus preferably is formed of plastic materials, the only requirement being that the plastic materials are impervious to salt water and that portions of the container be translucent for transmission of light. The material of the upper portion is preferably translucent, although it need not be fully transparent. In any case, suitable light-transfer characteristics aid and assist the present invention in communicating its position and the possibilities of a fish "nibble" to the fisherman.

The main portion 12 includes a thickened or built-up nose portion which has a recessed dimple or depression 26 for receiving the switch button of the pen-light as will be described. The built-up portion is substantial to maintain structural integrity on receiving the integrally-molded eyelet 16 which has a flared base for providing an adequate connection.

The upper end of the body portion 12 is externally threaded at 28 to engage a set of threads 30 formed internally at the lower end of the upper portion 18. On threaded engagement, the end lip of the lower means 12 engages the gasket 22 seated within an encircling groove in the upper means 18 with a view of forming a water-tight seal. Fluid integrity protects the apparatus within the container 10.

The member 18 is preferably cylindrical in shape from the threads to the upper end. The end wall is enlarged centrally to sufficiently embed the fastener or the eyelet means 20. The embedment structurally supports the improved float means 10 when connected to a fishing line. Centered in the member 18 and internally captured thereat is a coil spring 31 which seats against the end wall of the means 18 and which is centered within the chamber 24. The coil spring 31 bears on the upper shoulder of a small pen-light assembly 32. The assembly 32 incorporates an upper shoulder adapted to receive the spring 31 which places the pen-light assembly 32 under a compressive force. The pen-light assembly 32 has not been illustrated internally, but it preferably incorporates a suitable body for enclosing a small battery, a light bulb assembly at the upper end, and a switch assembly which is actuated by pressing the button 34 located at the lower end. When the pen-light assembly 32 is placed within the chamber 24, and the button 34 centered in the slight depression 26 formed at the lower end of the chamber, threaded movement of the top 18 and the spring 31 bears on the pen-light 32 in such a manner as to illuminate the apparatus 10. To this end, the spring 31 is preferably sufficiently strong to bear on the pen light assembly 32 and urge same toward the lower end 26 to actuate the switch by means of the button 34. When the switch is actuated, the chamber 24 is illuminated, and, of course, the translucent or semi-transparent means comprising the upper and lower portions transmits adequate light to be detected by the user.

While the foregoing is directed to one version of the present invention, it will be appreciated that other adaptations can be incorporated. For instance, the pen light assembly 32 is shown as a prepackaged separable item. This is because such items are relatively easily available at a modest price. However, it may be helpful to integrally construct the container for the battery and the switch mechanism with the lower portion 12. That is to say, it is not essential to have a separable light assembly in the chamber 24. It can be formed integrally. As a further alternative, the spring 31 which preferably incorporated urges the pen-light assembly 32 toward the bottom to actuate the switch may be omitted and a shoulder abutting the assembly 32 substituted. The use of a conveniently and easily purchased pen-light assembly as a complete unit for installation within the present invention may be varied. Should it be desired to provide an integrated structure, the spring 31 may not be necessary to this end.

Through the use of a conical reflector of polished aluminum or some other reflective surface, it is possible to include means with the present invention which directs light into the water. As is well known, fish are attracted to a light in or near the water. The preferred form shown in the single drawing directs some light toward the lower end of the float. However, this may be enhanced through the use of a reflector support on or in the coil spring 31 above the illuminated pen-light assembly 32. If greater downward illumination is desired, the pen-light assembly 32 may be inverted in the closed chamber. Other and further ways and means of using the illuminated float may be derived from the foregoing.

The hooks at the upper and lower ends of the float are the form preferred for fresh water. Other forms, including snap swivels and various eyelets may be adopted for connection with a fishing line, at the top of a leader, or as the case may be.

I claim:

1. Fishing apparatus adapted to be used with a fishing line, comprising:
   (a) a hollow buoyant body divided into at least two separable portions which are adapted to be joined one to the other, there being a gasket means for sealing said two or more separable portions on joinder to form said hollow buoyant body;
   (b) means for connecting said buoyant body to a fishing line in a manner to function as a fishing float;
   (c) a pen-light assembly having an upper shoulder;
   (d) said pen-light assembly disposed within said hollow buoyant body;
   (e) a switch button carried on said pen-light assembly at the lower end thereof;
   (f) a depression formed in said hollow buoyant body for receiving said switch button;
   (g) spring means disposed in one body portion bearing on the upper shoulder of said pen-light assembly for forcing said switch button into engagement with said depression to actuate the pen-light assembly; and,
   (h) a portion of said hollow buoyant body being at least semi-transparent to transmit light from said pen-light assembly to the user to enable the user to locate and observe movements and motions of said buoyant body when engaged with a fishing line in the water.

2. The invention of claim 1, wherein said means for connecting said buoyant body to a fishing line comprise eyelets embedded in the upper and lower ends of said buoyant body.

References Cited

UNITED STATES PATENTS

| | | | |
|---|---|---|---|
| 713,364 | 11/1902 | Uhlenhart | 43—17.5 X |
| 2,097,357 | 10/1937 | Watts | 43—17.5 X |
| 2,272,802 | 2/1942 | High et al. | 43—17.5 X |
| 2,527,956 | 10/1950 | Peevey | 43—17.5 |
| 2,908,101 | 10/1959 | Butler et al. | 43—17.5 |
| 3,041,771 | 7/1962 | Hreno | 43—17.5 |
| 3,292,294 | 12/1966 | Beach et al. | 43—17.5 |

SAMUEL KOREN, Primary Examiner

D. J. LEACH, Assistant Examiner

U.S. Cl. X.R.

240—6.4